US012760851B2

(12) United States Patent
Wang

(10) Patent No.: US 12,760,851 B2
(45) Date of Patent: Oct. 13, 2026

(54) LED STRIP LAMP

(71) Applicant: Yuhua Wang, Beijing (CN)

(72) Inventor: Yuhua Wang, Beijing (CN)

( * ) Notice: Subject to any disclaimer, the term of this patent is extended or adjusted under 35 U.S.C. 154(b) by 0 days.

(21) Appl. No.: 19/126,075

(22) PCT Filed: Nov. 6, 2023

(86) PCT No.: PCT/CN2023/129865

§ 371 (c)(1),
(2) Date: Apr. 30, 2025

(87) PCT Pub. No.: WO2024/120095

PCT Pub. Date: Jun. 13, 2024

(65) Prior Publication Data

US 2026/0185667 A1 Jul. 2, 2026

(30) Foreign Application Priority Data

Dec. 5, 2022 (CN) ......................... 202223246916.4

(51) Int. Cl.
*F21S 4/24* (2016.01)
*F21V 3/06* (2018.01)
(Continued)

(52) U.S. Cl.
CPC ................ *F21S 4/24* (2016.01); *F21V 3/062* (2018.02); *F21V 7/28* (2018.02); *F21V 13/02* (2013.01);
(Continued)

(58) Field of Classification Search
CPC ....... F21S 4/22; F21S 4/24; F21S 4/26; F21V 3/062; F21V 13/02; G02B 6/0021
See application file for complete search history.

(56) References Cited

U.S. PATENT DOCUMENTS

2002/0191386 A1* 12/2002 Cleaver ................ G02B 6/0001
362/558
2003/0198049 A1* 10/2003 Hulse .................. G02B 6/0005
362/800
(Continued)

FOREIGN PATENT DOCUMENTS

CN 203656837 U 6/2014
CN 205746245 U 11/2016
(Continued)

OTHER PUBLICATIONS

Global Dossier English Translation of ISA Written Opinion for PCT case (Year: 2024).*
(Continued)

*Primary Examiner* — Keith G. Delahoussaye
(74) *Attorney, Agent, or Firm* — Wissing Miller LLP

(57) ABSTRACT

An LED strip lamp includes a circuit board, a plurality of LED lamp beads on the circuit board, a light guide plate, and a reflective film. The light guide plate includes a body and a light exit portion connected to each other. A recessed circuit board accommodating groove is provided in the body. The circuit board is located in the circuit board accommodating groove and arranged such that a surface thereof on which the LED lamp beads are provided faces the circuit board accommodating groove. The reflective film covers the body and the circuit board. A transparent sheath is provided on the outermost layer of the LED strip lamp for tightly attaching the reflective film to the body. Light emitted from the LED lamp beads is emitted out through the light exit portion after being refracted and reflected multiple times by the body and the reflective film.

13 Claims, 2 Drawing Sheets

(51) Int. Cl.

| | |
|---|---|
| ***F21V 7/28*** | (2018.01) |
| ***F21V 8/00*** | (2006.01) |
| ***F21V 13/02*** | (2006.01) |
| ***F21Y 103/10*** | (2016.01) |
| ***F21Y 115/10*** | (2016.01) |

(52) U.S. Cl.

CPC ........ *G02B 6/0021* (2013.01); *F21V 2200/20* (2015.01); *F21Y 2103/10* (2016.08); *F21Y 2115/10* (2016.08)

(56) References Cited

U.S. PATENT DOCUMENTS

| | | | | |
|---|---|---|---|---|
| 2018/0245754 | A1* | 8/2018 | Gensler | F21V 3/10 |
| 2020/0335660 | A1* | 10/2020 | Kang | F21S 4/24 |

FOREIGN PATENT DOCUMENTS

| | | | |
|---|---|---|---|
| CN | 207648526 | U | 7/2018 |
| CN | 209229411 | U | 8/2019 |
| CN | 211450446 | U | 9/2020 |
| CN | 113915545 | A | 1/2022 |
| CN | 218582953 | U | 3/2023 |
| JP | 2006252913 | A | 9/2006 |

OTHER PUBLICATIONS

International Search Report and Written Opinion in corresponding PCT Application No. PCT/CN2023/129865 mailed Dec. 15, 2023.

* cited by examiner

LED STRIP LAMP

CROSS-REFERENCE TO RELATED APPLICATIONS

This application is a 371 of PCT/CN2023/129865 filed on Nov. 6, 2023, published on Jun. 13, 2024 under publication number WO 2024/120095 A1, which claims priority benefits from Chinese Patent Application No. 202223246916.4 filed Dec. 5, 2022, both of which are incorporated herein in their entirety by reference.

TECHNICAL FIELD

The present disclosure relates to the field of LED lamps, in particular to a decorative LED strip lamp with uniform light emission.

BACKGROUND

In the existing art, an LED strip lamp refers to a lighting product obtained by assembling a plurality of LED lamp beads on a strip-shaped flexible or rigid circuit board. Due to the LED strip lamp has long service life (typically 80,000 to 100,000 hours), and is energy efficiency and environmental friendliness, it has gradually gained prominence in various decorative industries.

The LED lamp beads on an existing LED strip lamp are arranged at intervals, leaving significant gaps between adjacent LED lamp beads. As a result, when the LED strip lamp emits light, users actually perceive a plurality of bright, discontinuous, and glaring spots rather than a uniform and soft luminous band. Therefore, the visual effect of such LED strip lamp is not yet ideal when used for decorative purposes.

SUMMARY

The purpose of the present disclosure is to overcome the above deficiencies in the existing art, and to provide an LED strip lamp with soft light and good visual effect.

To address the above technical problem, the purpose of the present disclosure is achieved by the technical means described herein below.

The present disclosure provides an LED strip lamp, including a circuit board, a plurality of LED lamp beads provided on the circuit board, a light guide plate, and a reflective film, where the light guide plate includes a body and a light exit portion connected to each other, the body is provided with a recessed circuit board accommodating groove in which the circuit board is located, the circuit board is arranged such that a surface thereof on which the LED lamp beads are provided faces the circuit board accommodating groove, the reflective film covers the body and the circuit board, a transparent sheath is further provided on an outermost layer of the LED strip lamp for tightly attaching the reflective film to the body, and light emitted from the LED lamp beads is emitted out through the light exit portion after being refracted and reflected multiple times by the body of the light guide plate and the reflective film.

The LED strip lamp of the present disclosure is further configured such that the transparent sheath is made of transparent plastic.

The LED strip lamp of the present disclosure is further configured such that the transparent sheath is made of heat-shrinkable transparent plastic.

The LED strip lamp of the present disclosure is further configured such that the LED lamp beads are white-light LED lamp beads or RGB tri-color-light LED lamp beads.

The LED strip lamp of the present disclosure is further configured such that the reflective film includes a reflective surface bonded to the body via an adhesive, and a non-reflective surface in contact with an inner surface of the transparent sheath.

The LED strip lamp of the present disclosure is further configured such that the LED strip lamp further includes a controller configured to control brightness and color of the light emitted from the LED strip lamp.

The LED strip lamp of the present disclosure is further configured such that a cross section of the light exit portion is of a circular shape.

The LED strip lamp of the present disclosure is further configured such that the circuit board is a flexible circuit board.

The LED strip lamp of the present disclosure is further configured such that the body and the light exit portion are connected to each other via a connection portion therebetween, and the connection portion includes a curvature-reversal segment into which the reflective film extends.

The LED strip lamp of the present disclosure is further configured such that a curvature of a cross-sectional profile curve of the connection portion in the curvature-reversal segment continuously transitions from a positive value to a negative value or from a negative value to a positive value.

The LED strip lamp of the present disclosure is further configured such that a cross-sectional curve at each position where the connection portion is connected to the body and the light exit portion is continuous.

The LED strip lamp of the present disclosure is further configured such that the connection portion, the body, and the light exit portion are integrally formed or are spliced together after being separately formed.

Through the above technical scheme, the LED strip lamp of the present disclosure has the following advantageous effect: light emitted from the LED lamp beads is fully mixed after being refracted and reflected multiple times by the light guide plate and the reflective film, so that the light finally emitted out through the light exit portion has uniform brightness without glare, exhibiting a good visual effect; and since a transparent sheath is provided on the outermost layer of the LED strip lamp, the reflective film is attached to the body of the light guide plate tightly and does not drop off easily. In addition, by providing a curvature-reversal segment in the connection portion between the light guide plate and the light exit portion, light is mixed again and becomes further scattered, thus an LED strip lamp with better light emission uniformity can be obtained.

The meanings of the reference signs in the figures are as follows:

1. LED strip lamp;
2. Circuit board;
21. LED lamp bead;
3. Light guide plate;
30. Connection portion;

31. Body;
32. Light exit portion;
33. Circuit board accommodating groove;
4. Reflective film;
5. Transparent sheath.

DETAIL DESCRIPTION OF EMBODIMENTS

To enable those skilled in the art to better understand the technical scheme of the present disclosure, the implementation of the present disclosure is described below with reference to specific embodiments.

Figure 1:
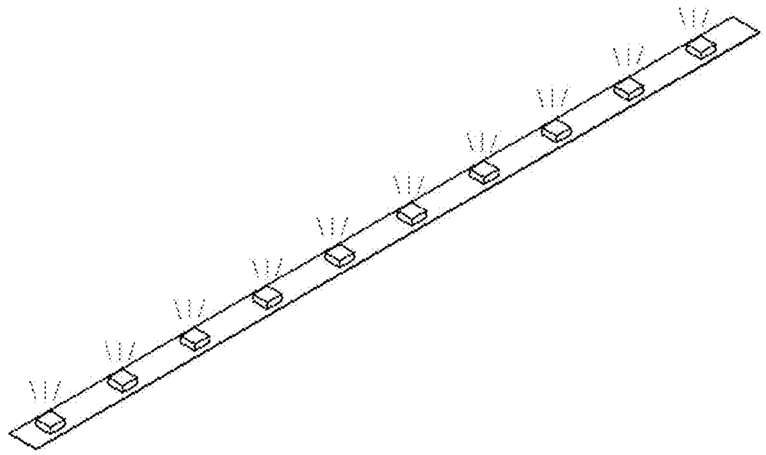
FIG. 1 is a schematic diagram of a LED strip lamp in the existing art.

FIG. 1 is a schematic diagram of a LED strip lamp in the existing art. It can be seen from the diagram that the areas of the LED strip lamp with LED lamp beads provided are glaring bright areas with high brightness, while the areas without LED lamp beads provided are dark areas with insufficient brightness, so that the uniformity of brightness distribution of the whole LED strip lamp along the length direction is difficult to ensure.

Figure 2:
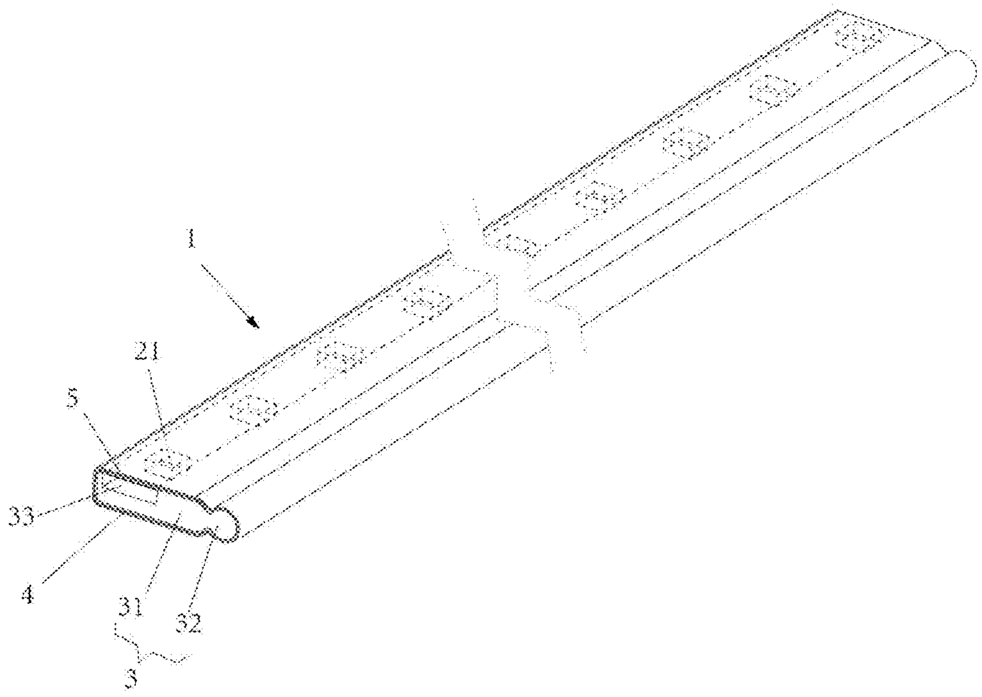
FIG. 2 is a schematic perspective view of an LED strip lamp of the present disclosure.
Figure 3:
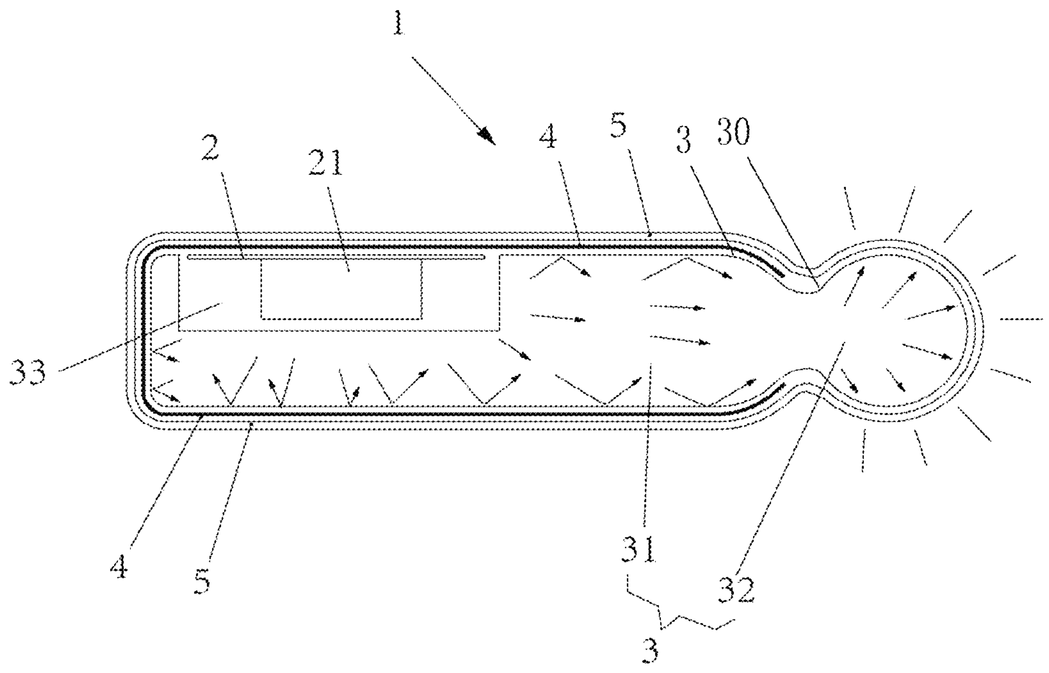
FIG. 3 is a schematic cross-sectional view of an LED strip lamp of the present disclosure.

FIGS. 2-3 illustrate an LED strip lamp 1 of the present disclosure. The LED strip lamp 1 includes an elongated circuit board 2, which may be, for example, a flexible circuit board, so that the LED strip lamp 1 can be bent into any desired shape, and of course may also be a rigid circuit board such as an aluminum substrate when used in applications where bending is not required. The circuit board 2 is provided with a plurality of LED lamp beads 21, which are arranged at intervals along the length direction of the circuit board 2. The LED lamp beads 21 may be RGB tri-color-light lamp beads, which can obtain various desired light color by mixing. In other embodiments, the LED lamp beads 21 may also be white-light LED lamp beads as needed.

The LED strip lamp 1 further includes an elongated light guide plate 3, which may be molded from an integrally formed transparent material, for example, transparent plastic. Examples of the transparent plastic are: polymethyl methacrylate (PMMA, commonly known as acryl or organic glass), polycarbonate (PC), polyethylene terephthalate (PET), polypropylene (PP), polyvinyl chloride (PVC), ABS, thermoplastic polyurethane elastomer rubber (TPU), polystyrene (PS), polysulfone (PSF), transparent nylon, and the like.

The light guide plate 3 includes a body 31 and a light exit portion 32 connected to each other in a space enclosed by the light guide plate, and a circuit board accommodating groove 33 recessed downward is provided in the body 31. The length direction of the circuit board accommodating groove 33 is parallel to the length direction of the light guide plate 3. When assembling the LED strip lamp 1, the circuit board 2 is located in the circuit board accommodating groove 33, and the circuit board 2 is arranged such that a surface thereof on which the LED lamp beads 21 are provided faces the circuit board accommodating groove 33 (downward in FIG. 2). The LED strip lamp 1 further includes a reflective film 4, which covers the body 31 of the light guide plate 3 and the circuit board 2, but does not cover the light exit portion 32 of the light guide plate 3. The light emitted from the LED lamp beads 21 is fully mixed after being reflected and refracted multiple times by the reflective film 4 and the body 31 of the light guide plate 3, and is finally emitted out through the light exit portion 32. At this time, the brightness at various positions in the length direction of the light exit portion 32 has been uniformized, and it is substantially impossible to distinguish bright areas and dark areas.

In order to make the reflective film 4 and the body 31 of the light guide plate 3 be attached to each other more tightly so as to avoid the reflective film 4 from dropping off during use, a transparent sheath 5 is further provided on the outermost layer of the LED strip lamp 1. The transparent sheath 5 is made of transparent plastic, for example, a heat-shrinkable transparent plastic tube is used. The heat-shrinkable transparent plastic tube is sleeved outside the light guide plate 3 and the reflective film 4. When being applied a certain heat, the heat-shrinkable transparent plastic tube will shrink due to heat to attach the reflective film 4 and the light guide plate 3 tightly, thereby achieving a better reflection effect and an anti-drop-off effect.

As shown in FIG. 2 or FIG. 3, air is allowed between the light guide plate 3 and the transparent sheath 5, i.e., the reflective film 4 may be positioned in an air layer between the light guide plate 3 and the transparent sheath 5.

Further, in order to make the emitted light softer, the light guide plate 3 may also be made of translucent plastic material or material doped with pigments or dyes to achieve a special visual effect.

One side of the reflective film 4 is a reflective surface bonded to the body 31 via an adhesive, and the other side of the reflective film 4 is a non-reflective surface in contact with an inner surface of the transparent sheath 5.

The LED strip lamp 1 further includes a controller (not shown in the figures) configured to control the brightness and color of the light emitted from the LED strip lamp 1.

As shown in FIG. 3, the light exit portion 32 has a cross section of a circular shape, and of course, the cross section of the light exit portion 32 may have various other shapes as needed, for example, polygonal shapes, such as a triangular shape, a square shape, a pentagonal shape. For example, the body 31 has a substantially rectangular cross section having a height (thickness) substantially equal to the height (thickness) of the light exit portion 32.

In the present embodiment, the body 31 and the light exit portion 32 are connected to each other via a connection portion (a neck portion or a tapered portion) 30 therebetween, and the connection portion 30 includes a curvature-reversal segment into which the reflective film 4 extends. At this time, the reflective film 4 covers the body 31 of the light guide plate 3, the circuit board 2, and a part of the connection portion 30 between the body 31 and the light exit portion 32, but still does not cover the light exit portion 32 of the light guide plate 3.

In the present embodiment, the curvature of the curvature-reversal segment of the connection portion 30 continuously transitions from a positive value to a negative value or from a negative value to a positive value. That is, in this curvature-reversal segment, the bending direction of the cross-sectional profile curve of the connection portion 30 continuously transitions from inward bending to outward bending or from outward bending to inward bending. As shown in FIG. 3, the connection portion 30 is contracted with respect to the body 31 and the light exit portion 32, i.e., the dimension of the connection portion 30 at the narrowest position thereof is smaller than the thickness of either the body 31 or the light exit portion 32.

In the present embodiment, the cross-sectional curve at each position where the connection portion 30 is connected to the body 31 and the light exit portion 32 is continuous.

Here, the continuity of the curve has the same meaning as the definition of continuity of mathematical function.

As described above, the light guide plate 3 may be molded from an integrally formed transparent material, but the present disclosure is not limited thereto; the light guide plate 3 may also be formed by splicing the connection portion 30, the body 31, and the light exit portion 32 together, as long as the continuity of the connection portion can be ensured.

Due to the presence of the curvature-reversal segment, on one hand, light emitted from the LED lamp beads 21 is fully mixed after being reflected and refracted multiple times by the reflective film 4 and the body 31 of the light guide plate 3; on the other hand, the reflected and refracted light reaching the curvature-reversal segment of the connection portion 30 will be mixed again (mixed for a second time) under the action of the reflective film 4 (which has the same curvature as the curvature-reversal segment) extending into the curvature-reversal segment and become scattered, and then the light after second mixing will be finally emitted out through the light exit portion 32. At this time, the brightness at various positions in the length direction of the light exit portion 32 is more uniform, and it is substantially impossible to distinguish bright areas and dark areas.

Although the principal features, technical principles and advantages of the present disclosure have been described in conjunction with the embodiments, the embodiments are not intended to limit the present disclosure, and any modifications, equivalents and improvements made to the present disclosure without departing from the spirit and principles of the present disclosure shall fall within the scope of the present disclosure.

What is claimed is:

1. An LED strip lamp, comprising: a circuit board, a plurality of LED lamp beads provided on the circuit board, a light guide plate, and a reflective film, wherein the light guide plate comprises a body and a light exit portion connected to each other, the body is provided with a recessed circuit board accommodating groove in which the circuit board is located, the circuit board is arranged such that a surface thereof on which the LED lamp beads are provided faces the circuit board accommodating groove, the reflective film covers the body and the circuit board, a transparent sheath is provided on an outermost layer of the LED strip lamp for attaching the reflective film to the body, wherein light emitted from the LED lamp beads is emitted out through the light exit portion after being refracted and reflected multiple times by the body of the light guide plate and the reflective film, and wherein the reflective film comprises a reflective surface bonded to the body via an adhesive, and a non-reflective surface in contact with an inner surface of the transparent sheath.

2. The LED strip lamp of claim 1, wherein the transparent sheath is made of transparent plastic.

3. The LED strip lamp of claim 2, wherein the transparent sheath is made of heat-shrinkable transparent plastic.

4. The LED strip lamp of claim 1, wherein the LED lamp beads are white-light LED lamp beads or RGB tri-color-light LED lamp beads.

5. The LED strip lamp of claim 1, wherein the LED strip lamp further comprises a controller configured to control brightness and color of the light emitted from the LED strip lamp.

6. The LED strip lamp of claim 1, wherein a cross section of the light exit portion is of a circular shape.

7. The LED strip lamp of claim 1, wherein the circuit board is a flexible circuit board.

8. The LED strip lamp of claim 1, wherein the body and the light exit portion are connected to each other via a connection portion therebetween, the connection portion comprises a curvature-reversal segment into which the reflective film extends.

9. The LED strip lamp of claim 8, wherein a curvature of a cross-sectional profile curve of the connection portion in the curvature-reversal segment continuously transitions from a positive value to a negative value or from a negative value to a positive value.

10. The LED strip lamp of claim 9, wherein a cross-sectional curve at each position where the connection portion is connected to the body and the light exit portion is continuous.

11. The LED strip lamp of claim 8, wherein the connection portion, the body and the light exit portion are integrally formed or are spliced together after being separately formed.

12. The LED strip lamp of claim 9, wherein the connection portion, the body and the light exit portion are integrally formed or are spliced together after being separately formed.

13. The LED strip lamp of claim 10, wherein the connection portion, the body and the light exit portion are integrally formed or are spliced together after being separately formed.

* * * * *